US00RE33866E

United States Patent [19]

Schutten et al.

[11] E Patent Number: Re. 33,866

[45] Reissued Date of Patent: Mar. 31, 1992

[54] RESONANT INVERTER EMPLOYING FREQUENCY AND PHASE MODULATION USING OPTIMAL TRAJECTORY CONTROL

[75] Inventors: Michael J. Schutten, Schenectady; John N. Park, Rexford, both of N.Y.; Ming H. Kuo, Caledonia, Ill.

[73] Assignee: General Electric Company, Schenectady, N.Y.

[21] Appl. No.: 639,557

[22] Filed: Dec. 20, 1990

Related U.S. Patent Documents

Reissue of:

[64] Patent No.: 4,951,185
Issued: Aug. 21, 1990
Appl. No.: 379,461
Filed: Jul. 13, 1989

[51] Int. Cl.[5] ..... H02M 3/337

[52] U.S. Cl. ..... 363/17; 363/98

[58] Field of Search ..... 378/110, 112; 363/17, 363/28, 98

[56] References Cited

U.S. PATENT DOCUMENTS

| | | | |
|---|---|---|---|
| 4,477,868 | 10/1984 | Steigerwald | 363/28 |
| 4,541,041 | 9/1985 | Park et al. | 363/41 |
| 4,670,832 | 6/1987 | Park | 363/17 |
| 4,672,528 | 6/1987 | Park et al. | 363/98 |

OTHER PUBLICATIONS

Oruganti, Ramesh and Lee, Fred C., "Resonant Power Processors: Part I—State Plane Analysis", 1984 Industry Applications Society Proceedings, pp. 860–867.

Oruganti, Ramesh and Lee, Fred C., "Resonant Power Processors: Part II—Methods of Control", 1984 Industry Applications Society Proceedings, pp. 868–878.

Oruganti et al., "Implementation of Optimal Trajectory Control of Series Resonant Converter", 1987 Power Electronics Specialty Conference Proceedings, pp. 451–459.

*Primary Examiner*—William H. Beha, Jr.

*Attorney, Agent, or Firm*—Jill M. Breedlove; James C. Davis, Jr.; Marvin Snyder

[57] ABSTRACT

A series resonant inverter is controlled to provide a substantially constant output voltage to a load. The control utilizes a combination of optimal control methods and phase modulation to enable time optimal responses to changes in state of the system. State determinants (including resonant capacitor voltage, resonant inductor current, source voltage, and output load voltage) are continuously monitored, and an optimal control signal is generated therefrom. When operating within the operable frequency range of the inverter's controllable switch means, frequency is varied to maintain proper operation. When operating at an extremity of the operable frequency range, phase modulation is employed.

9 Claims, 9 Drawing Sheets 28
29
VOLTAGE SENSOR
$V_C$
$k_3 V_C$
25
VOLTAGE SENSOR
$V_O$
$k_3 V_O$
23
VOLTAGE SENSOR
$V_S$
$k_3 V_S$
21
CURRENT SENSOR
$i_L$
$k_1 i_L$
19
X F
34
$F k_3 V_O$
40
$k_3 V_C$
$k_3 (V_C + F V_O)$
X COS φ
31
φ
$k_3 V_S \cos\phi$
42
$k_3 F V_S \cos\phi$
X F
32
$k_3 (V_C + F V_O + F V_S \cos\phi)$
F
30
SQUARER
44
SQUARER
36
$K_2 (Z_O i_L)^2$
46
$K_2 (V_C + F V_O + F V_S \cos\phi)^2$
27

CP1
1
0

Q1
1
0

$\overline{Q1}$
1
0

+10V
$V_G$
0V

10V
$V_\phi$
0V

CP2
1
0

Q2
1
0

$\overline{Q2}$
1
0

$+V_S$
$V_{ab}$
0
$-V_S$

RESONANT INVERTER EMPLOYING FREQUENCY AND PHASE MODULATION USING OPTIMAL TRAJECTORY CONTROL

Matter enclosed in heavy brackets [ ] appears in the original patent but forms no part of this reissue specification; matter printed in italics indicates the additions made by reissue.

FIELD OF THE INVENTION

The present invention relates generally to resonant inverters. More particularly, this invention relates to a series resonant inverter with improved control which utilizes a method of optimal control in combination with phase modulation to maintain substantially constant output voltage over a wide range of operating conditions.

BACKGROUND OF THE INVENTION

Resonant inverters advantageously have low switching losses and low switching stresses. However, resonant operation is complex due to the fast dynamics of the high-frequency resonant tank circuit; and, hence, control is difficult. Disadvantageously, when input power or output load conditions vary, output voltage or current control cannot be achieved through the use of usual control techniques. For example, one known resonant inverter output load voltage or current control method is to vary the frequency of the rectangular wave signal supplied to the resonant circuit by the inverter via closed loop control. Commonly assigned U.S. Pat. No. 4,541,041, issued on Sept. 10, 1985 to J. N. Park and R. L. Steigerwald, which is hereby incorporated by reference, discloses in part such a frequency control technique. Briefly explained, the resonant nature of the circuit allows for control of output voltage or current through variation of the frequency at which the inverter's controllable switch means operate. Such a frequency control method has been formed satisfactory under normal output load conditions for particular types of resonant inverters (i.e., heavy or medium load conditions for a series resonant inverter and light load conditions for a parallel resonant inverter). The drawback to frequency control, however, is that it may be inadequate to maintain a desired output voltage or current under extended output load conditions (i.e., light or no load conditions for a series resonant inverter and heavy load conditions for a parallel resonant inverter).

In particular, frequency control of a series resonant inverter will normally be adequate to maintain a desired output voltage during heavy or medium load conditions (i.e., low load resistance); that is, for heavy or medium load conditions, a series resonant circuit has a high quality factor Q and thus a good dynamic range of voltage or current change as frequency is varied. However, under extended or light output load conditions (i.e., high load resistance) the series resonant circuit exhibits a low quality factor Q and thus only a small dynamic range of output voltage or current change can be achieved as a function of frequency. As a result, for a series resonant inverter, it may be impossible to maintain a desired output voltage or current under light load and no load conditions solely with frequency control.

A resonant inverter control which provides an improved dynamic range of output voltage or current control is disclosed in U.S. Pat. No. 4,672,528, issued June 9, 1987 to J. N. Park and R. L. Steigerwald and assigned to the assignee of the present invention. This patent, which is hereby incorporated by reference, describes a resonant inverter which is controlled using either a frequency control mode or a phase shift control mode. In the frequency control mode, output voltage is controlled by varying the frequency of the rectangular wave signal supplied to the resonant circuit within an operable range of the controllable switch means. Selecting means allows the control to operate in the phase shift control mode when the frequency of the rectangular wave signal is at an extremity of the operable range of the controllable switch means.

Another method of resonant inverter control, which is derived from optimal control theory and state plane analysis, is presented in "Resonant Power Processors: Part II-Methods of Control" by Ramesh Oruganti and Fred C. Lee, 1984 Industry Applications Society Proceedings, pp. 868–878, and is hereby incorporated by reference. According to this method, hereinafter designated "optimal trajectory control" to be described in detail below, each state trajectory corresponds to particular values of instantaneous resonant tank energy, output voltage, output current and switching frequency. These state trajectories are utilized to define a control law for the inverter control system which enables a series resonant inverter to respond quickly to load and control requirements. Disadvantageously, however, in the method of "optimal trajectory control", as it presently exists, the controlled range of output voltages is limited in the same manner as the hereinabove described conventional frequency control method.

Accordingly, it is an object of the present invention to provide a new and improved resonant inverter exhibiting an improved dynamic range of output load voltage control.

Another object of this invention is to provide a new and improved resonant inverter control which utilizes a combination of optimal control methods and phase modulation to maintain output load voltage substantially constant during all loading conditions.

Still another object of this invention is to provide a new and improved resonant inverter control which switches automatically between different control means to maintain a substantially constant output load voltage.

Yet another object of the present invention is to provide an improved method of controlling a resonant inverter in order to maintain a desired output load voltage.

SUMMARY OF THE INVENTION

In accordance with the present invention, a new and improved resonant inverter is controlled using a combination of optimal trajectory control and phase modulation. In particular, optimal control means are employed to continuously monitor resonant capacitor voltage, resonant inductor current, [rectangular wave voltage applied to the resonant tank circuit] *source voltage* and output load voltage, thereby determining the instantaneous "states" of the resonant inverter. A control law, defined in terms of state plane analysis, enables maintenance of stable operation on state trajectories corresponding to particular values of the aforementioned state determinants. In this way, the improved control enables a time optimal response corresponding to a change in load conditions and, hence, a fast and efficient transition between state trajectories.

For a series resonant inverter operating above resonance, there is a maximum frequency at which the controllable switch means can adequately function. When operating within the operable frequency range of the controllable switch means (i.e. below this maximum frequency and above the resonant frequency), a first control means provides frequency control signals which frequency modulate the rectangular wave voltage applied to the series resonant circuit so as to provide a constant output voltage and maintain stable operation. At an extremity of the operable frequency range of the controllable switch means, inverter control automatically switches to a second control means. The second control means calculates a phase modulation angle corresponding to the desired output voltage and generates a phase shift control signal representative thereof. By thus combining a method of optimal control with phase modulation, a broader dynamic range of output load voltage can be achieved under all operating conditions.

In another aspect of the present invention, a method is provided for controlling output load voltage through a combination of optimal control methods and phase modulation.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
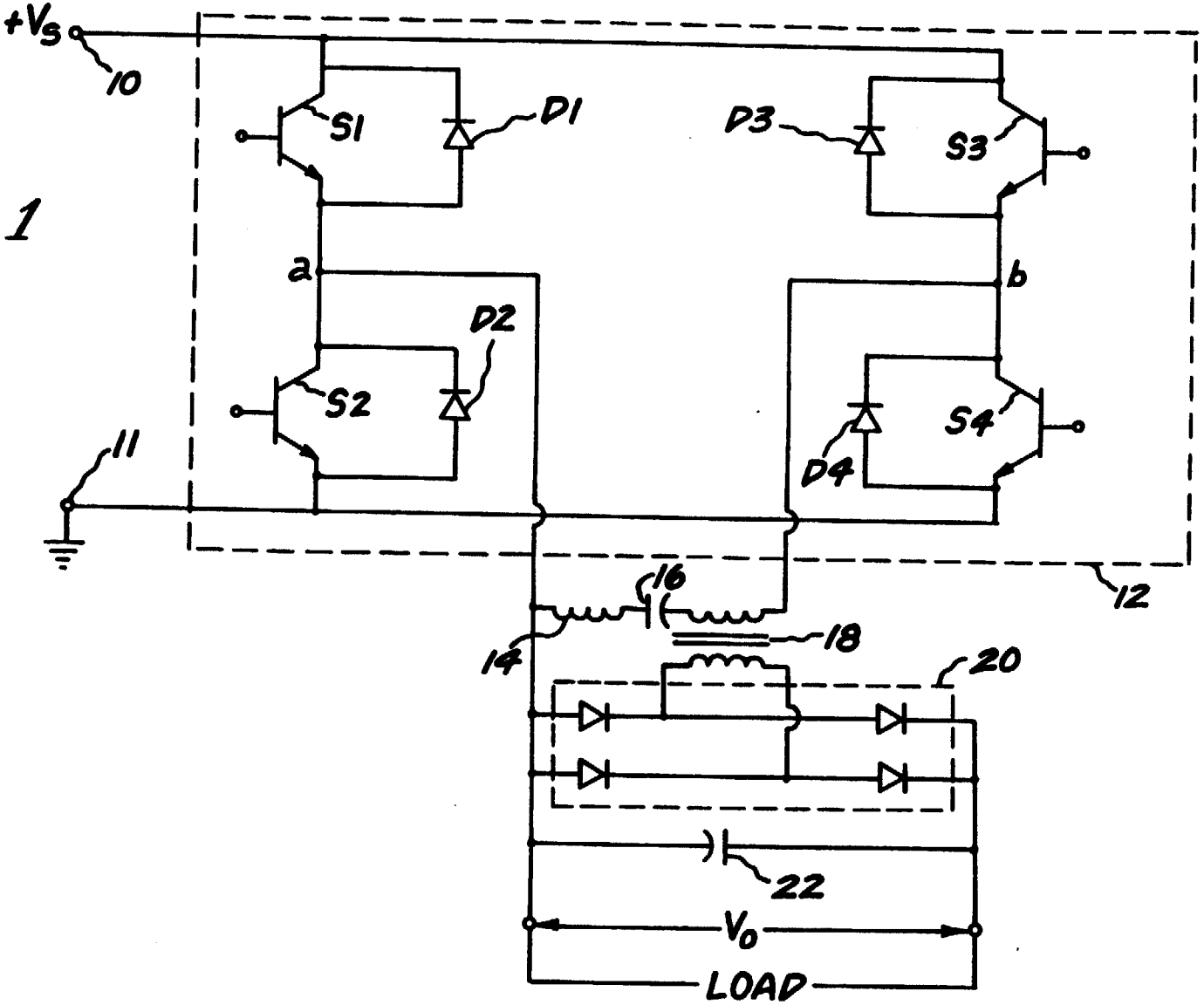
FIG. 1 is a schematic representation of a dc-to-dc converter including a series resonant inverter.

The improved resonant inverter control of the present invention will be described with reference to the dc-to-dc converter shown in FIG. 1. An external source (not shown) provides input dc voltage $V_s$ to the converter at terminals 10 and 11. Connected across terminals 10 and 11 is a full bridge inverter 12 having four switching devices that are capable of carrying reverse current and capable of being turned off by a switching signal. The switching devices are illustrated as bipolar junction transistors (BJTs) S1, S2, S3 and S4. Each respective switching device has a diode D1, D2, D3 and D4 connected in inverse parallel therewith, respectively. In operation above the resonant frequency, the switching devices are turned on at zero current, and the inverse parallel diodes are commutated naturally. Hence, fast recovery diodes are not required. Moreover, other switching devices with gate turn-off capability could be used instead of the BJTs, such as FETs each having an integral parasitic diode for carrying reverse current or monolithic Darlington power transistors. It is further to be understood that the full bridge inverter is illustrated for purposes of description only and that the control technique of the present invention is not limited to such an inverter.

A series resonant tank circuit, comprising an inductor 14, a capacitor 16, and the primary winding of an isolation transformer 18, is connected between junctions a and b. The secondary winding of transformer 18 is connected to the input of a full wave rectifier 20. The output of the rectifier is connected in parallel with a filter capacitor 22 and an output load (not shown) across which the converter output voltage $V_o$ is produced.

Figure 2:
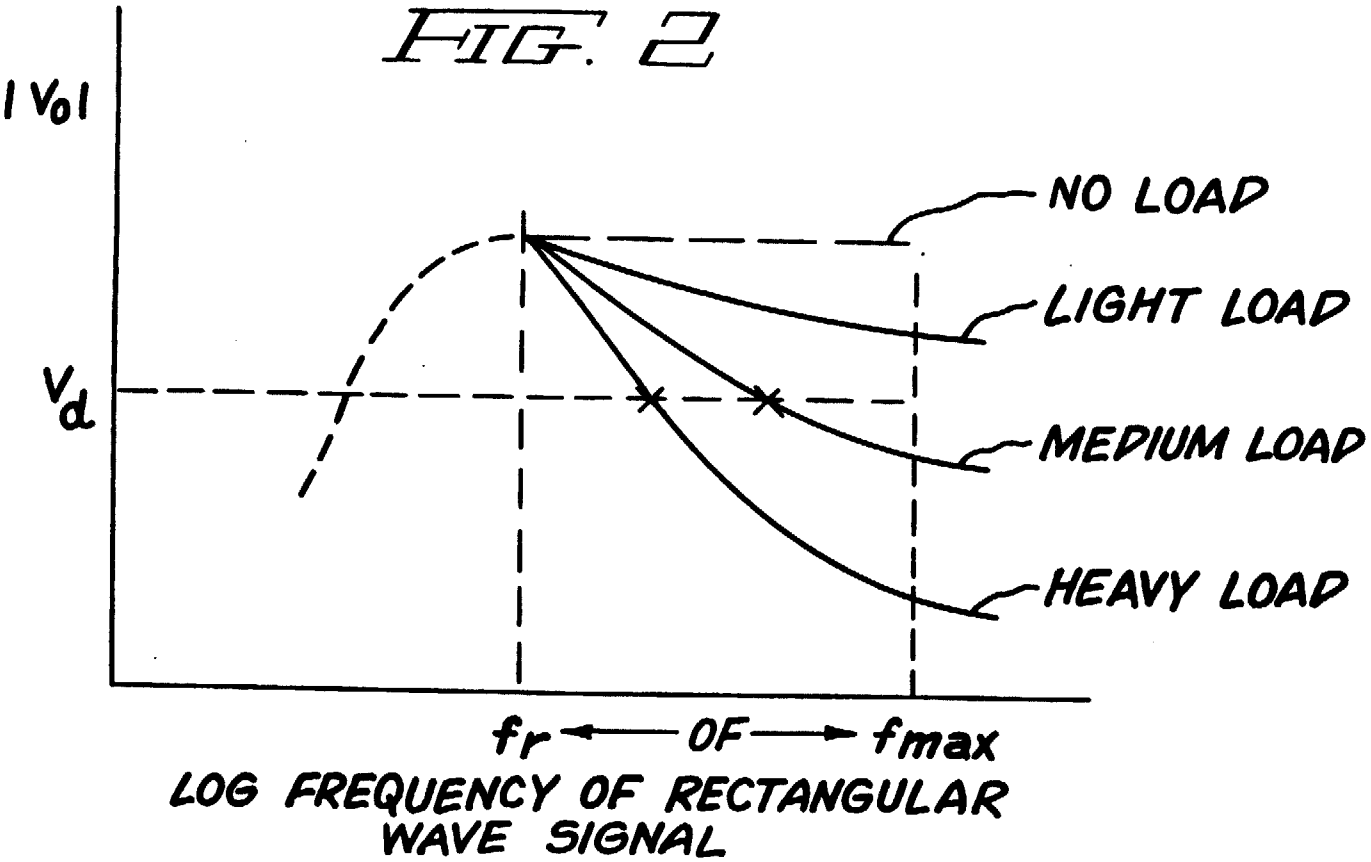
FIG. 2 is a graphical illustration showing the magnitude of the output voltage plotted against the log of the frequency of the rectangular wave signal supplied to the series resonant circuit employed in the inverter of FIG. 1 for heavy load, medium load, light load and no load conditions.

The resonant nature of the output load voltage of the inverter of FIG. 1 is shown graphically in FIG. 2, where the magnitude of the output load voltage is plotted against the log of the frequency of the rectangular alternating voltage $V_{ab}$ which is produced by inverter 12 and applied across the series resonant circuit. For proper power switch self-commutation, operation above the natural resonant frequency $f_r$ is necessary. However, there is a maximum frequency $f_{max}$ beyond which these switching devices will fail to operate satisfactorily. Thus, an operable range OF of the switching devices is defined as that frequency range between $f_r$ and $f_{max}$. During medium or high output load conditions, variation of frequency within this operable range OF is sufficient to provide the desired output voltage or current control. As illustrated graphically in FIG. 2, a desired converter output load voltage $V_d$ may be maintained during heavy load and medium load conditions by frequency control of the rectangular wave voltage $V_{ab}$. However, during light load and theoretical no load conditions, variation of frequency within the operable range OF would be insufficient to attain the desired output load voltage $V_d$. The present invention, therefore, employs a control technique for enhancing the dynamic range of converter output voltage control primarily needed under light load or no load conditions.

Within the operable frequency range OF of the controllable switching devices, the switches are controlled by a method of optimal trajectory control. This method is derived from optimal control theory and state plane analysis. In accordance therewith, the "control law" of the system is determined by the desired state of the system. An instantaneous state of the system is a function of resonant capacitor voltage, resonant inductor current. [voltage applied to the resonant tank circuit] *source voltage* and output load voltage. An instantaneous state corresponds to a specific state trajectory. The desired state trajectory, therefore, determines the control law of the system.

Figure 3:
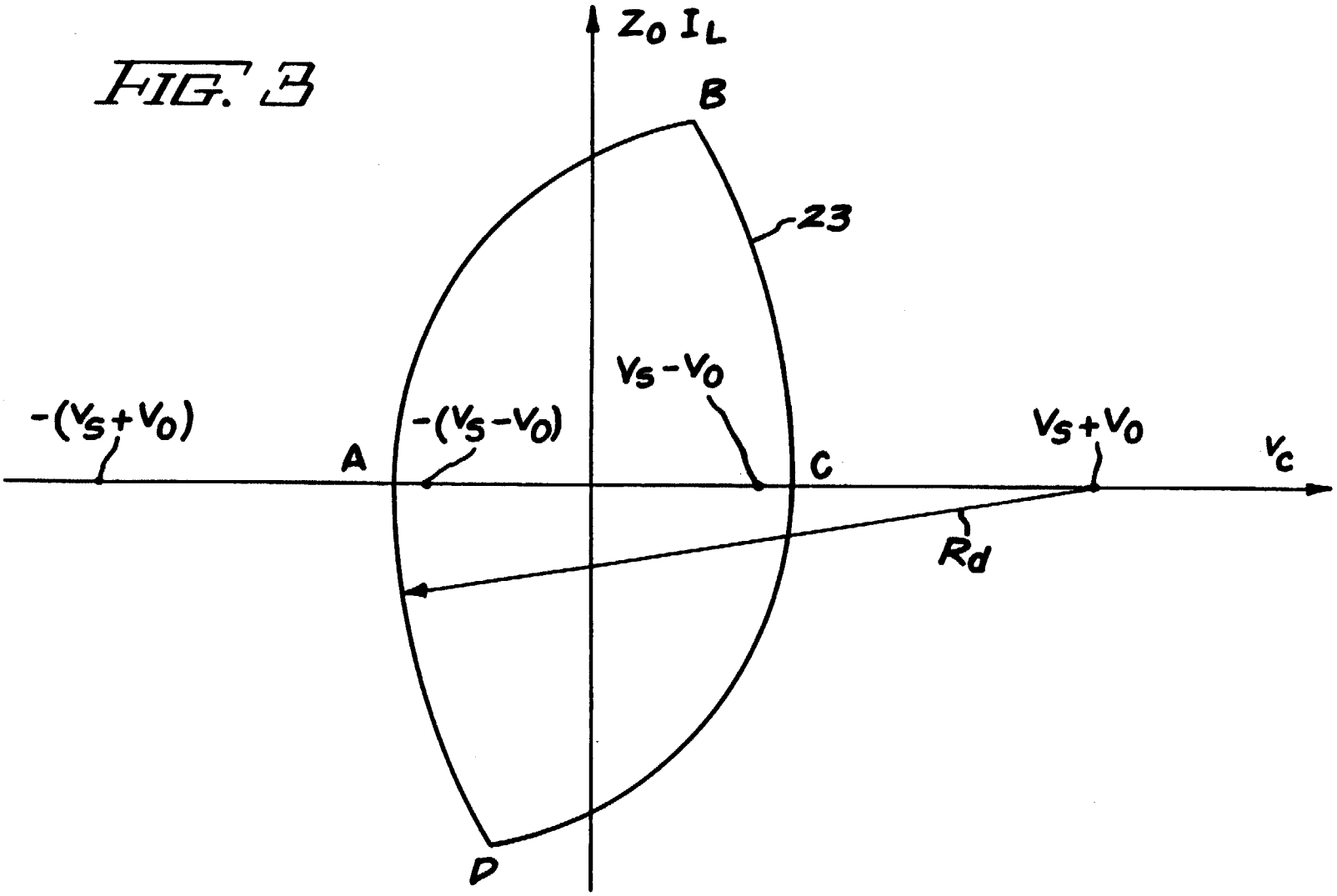
FIG. 3 is a single state trajectory, state plane diagram for the resonant inverter of FIG. 1 operating above the resonant frequency.

For operation above the resonant frequency $f_r$, FIG. 3 illustrates a state plane diagram for the resonant inverter of FIG. 1. At the outset of the ensuing state plane analysis, it is assumed that filter capacitor 22 is sufficiently large such that the output voltage $V_o$ remains constant during any single switching cycle interval As used herein, the term "switching cycle interval" is defined as the time necessary to traverse a state trajectory. In FIG. 3, state trajectory 23 represents the desired resonant inverter operation and corresponds to a particular operating frequency and to specific values of the above-listed state determinants (i.e., resonant capacitor voltage, resonant inductor current, [voltage applied to the resonant tank circuit] *source voltage*, and output load voltage). Specifically, as a two-dimensional state representation, the state trajectory is a plot of $Z_o i_L$ versus $v_C$, where: $Z_o=\sqrt{L/C}$ is the characteristic impedance of the series resonant circuit; $i_L$ represents resonant inductor [Current;] *current* and $v_C$ represents resonant capacitor voltage. Trajectory 23 comprises trajectory segments AB, BC, CD and DA corresponding to the conduction intervals of switching devices S1-S4 and diodes D1-D4. Each trajectory segment is a circular arc with a center and a radius determined by the state of the switching devices. For example, when switching devices S1 and S4 are conducting, current flows from node a through the series resonant circuit to node b, and the effective voltage applied to the series resonant circuit is $V_S-V_O$. As a result, trajectory segment AB having center $(V_s-V_o, 0)$ represents the conduction interval of switching devices S1 and S4. The remaining trajectory segment centers are similarly determined as follows:trajectory segment BC having center $(-V_s-V_o, 0)$ represents the conduction interval for diodes D2 and D3; trajectory segment CD having center $(-V_s+V_o, 0)$ represents the conduction interval for switching devices S2 and S3; and trajectory segment DA having center $(V_s+V_o, 0)$ represents the conduction interval for diodes D1 and D4.

As hereinabove discussed, the desired or optimal trajectory determines the control law of the system and, hence, the construction thereof. Besides the trajectory center, described hereinabove, another parameter characterizing each trajectory segment is the trajectory radius $R_d$ measured either from center $(V_s+V_o, O)$ or center $(-V_s-V_o, O)$. In operation, a control circuit computes radius $R_d$ from continuous measurements of the state determinants (i.e., resonant capacitor voltage, resonant inductor current, [voltage applied to the resonant tank circuit] *source voltage*, and output load voltage). In this way, the control circuit maintains system operation corresponding to the desired state trajectory by alternately switching the pairs of diagonally opposed switching devices. Moreover, when any of the state determinants changes, a control signal $V_{CONTROL}$ generated by an outer control loop, to be described hereinafter, enables the system to respond by making a time optimal transition to another steady state trajectory.

In the article entitled "Implementation of Optimal Trajectory Control of Series Resonant Converters", by Ramesh Oruganti et al., 1987 Power Electronics Specialty Conference Proceedings, pp. 451–459, which is hereby incorporated by reference, the control law for a resonant inverter operating below resonance is derived on pages 453–454 as:

$$(R_dV_s)^2=(V_c+FV_o-FV_s)^2+(i_LZ_o)^2, \quad (1)$$

where F is either +1 or −1, depending upon the sign of the inductor current $i_L$.

The control law of an inverter operating above resonance, such as that of the present invention, may be similarly derived and may be expressed as:

$$[(R_dV_s)^2=(v_c-FV_o-FV_s)^2+(i_LZ_o)^2.]$$

$$(R_dV_s)^2=(v_c+FV_o+FV_s)^2+(i_LZ_o)^2. \quad (2)$$

Figure 4A:
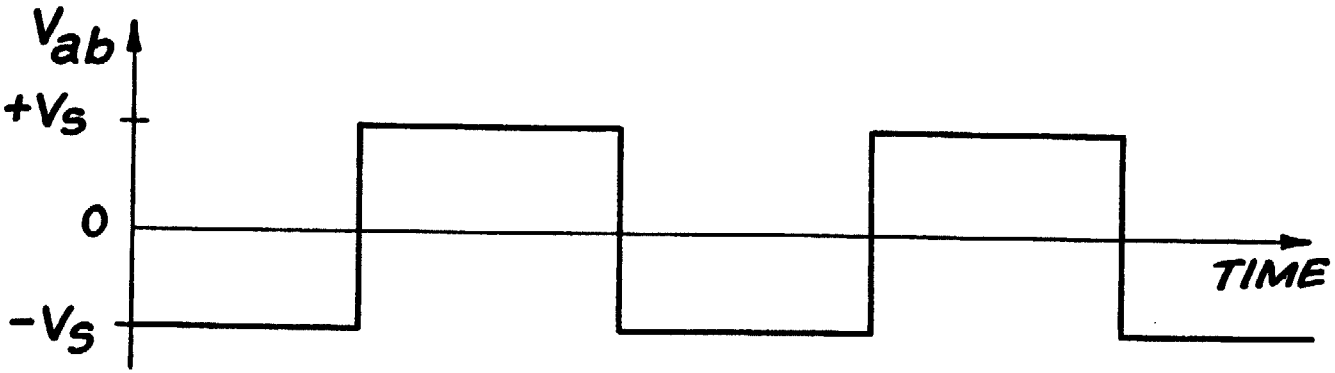
FIG. 4a is a graphical representation of the rectangular wave voltage applied to the series resonant inverter of FIG. 1.

A resonant inverter control system constructed in accordance with the control law of equation (2) advantageously enables time optimal control of the switching devices when operating above resonance within the operable frequency range thereof Disadvantageously, however, optimal trajectory control according to [oruganti] *Oruganti* et al. is limited to bi-level or frequency modulation. That is, as shown in FIG. 4A, the voltage applied to the resonant circuit is a rectangular wave signal having two levels: $+V_S$ and $-V_S$. Using optimal trajectory control, frequency of the rectangular wave signal may be varied to control output load voltage. Hence, like conventional frequency control methods, the control range of output voltage is limited as the frequency increases to the maximum operating frequency of the switching devices. The present invention, therefore, modifies and improves the above-described optimal trajectory control system to provide a new resonant control which yields a significantly increased range of controlled output load voltages under all loading conditions. In accordance therewith, the present invention combines optimal trajectory control with phase modulation.

Figure 4B:
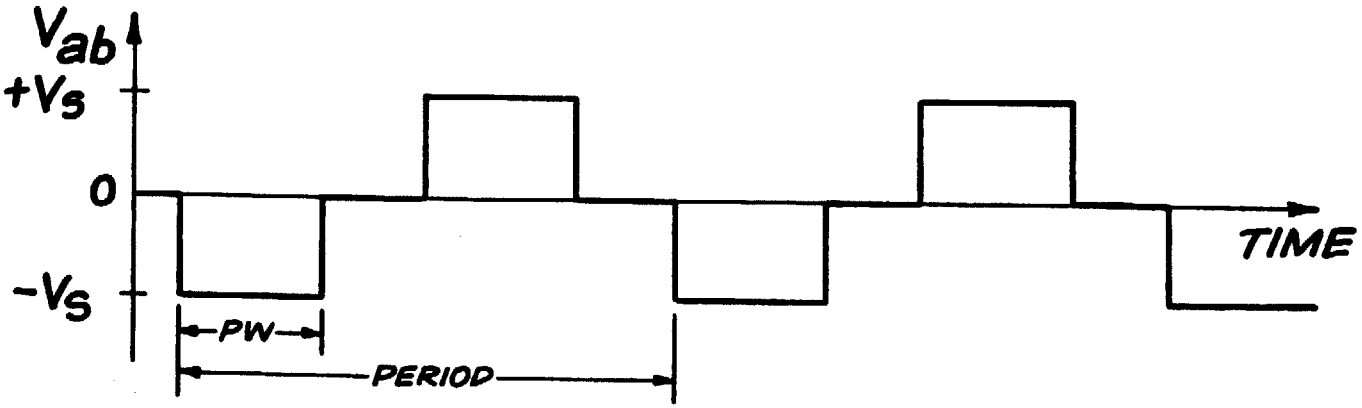
FIG. 4b is a graphical representation of the phase modulated signal of FIG. 4.

Since a series resonant circuit acts like a second order filter to the rectangular wave voltage applied to the resonant tank circuit, as will be appreciated by those of ordinary skill in the art, a useful approximation is that only the first harmonic of the rectangular wave signal is applied to the resonant tank circuit. Further, if the rectangular wave signal of FIG. 4A is phase modulated, then the phase modulated signal takes the general tri-level form illustrated in FIG. 4B, where pulse width pw varies proportionately as the phase modulation angle $\phi$. The fundamental harmonic F1 of this phase modulated signal is represented as:

$$[F1=4\pi V_s\cos\phi,]$$

$$F1=\frac{4}{\pi}V_s\cos\phi, \quad (3)$$

where $\phi=\pi/2\times(1-2\times pw/period)$, as shown in FIG. 4B, and $\phi$ is defined in units of radians.

Figure 5:
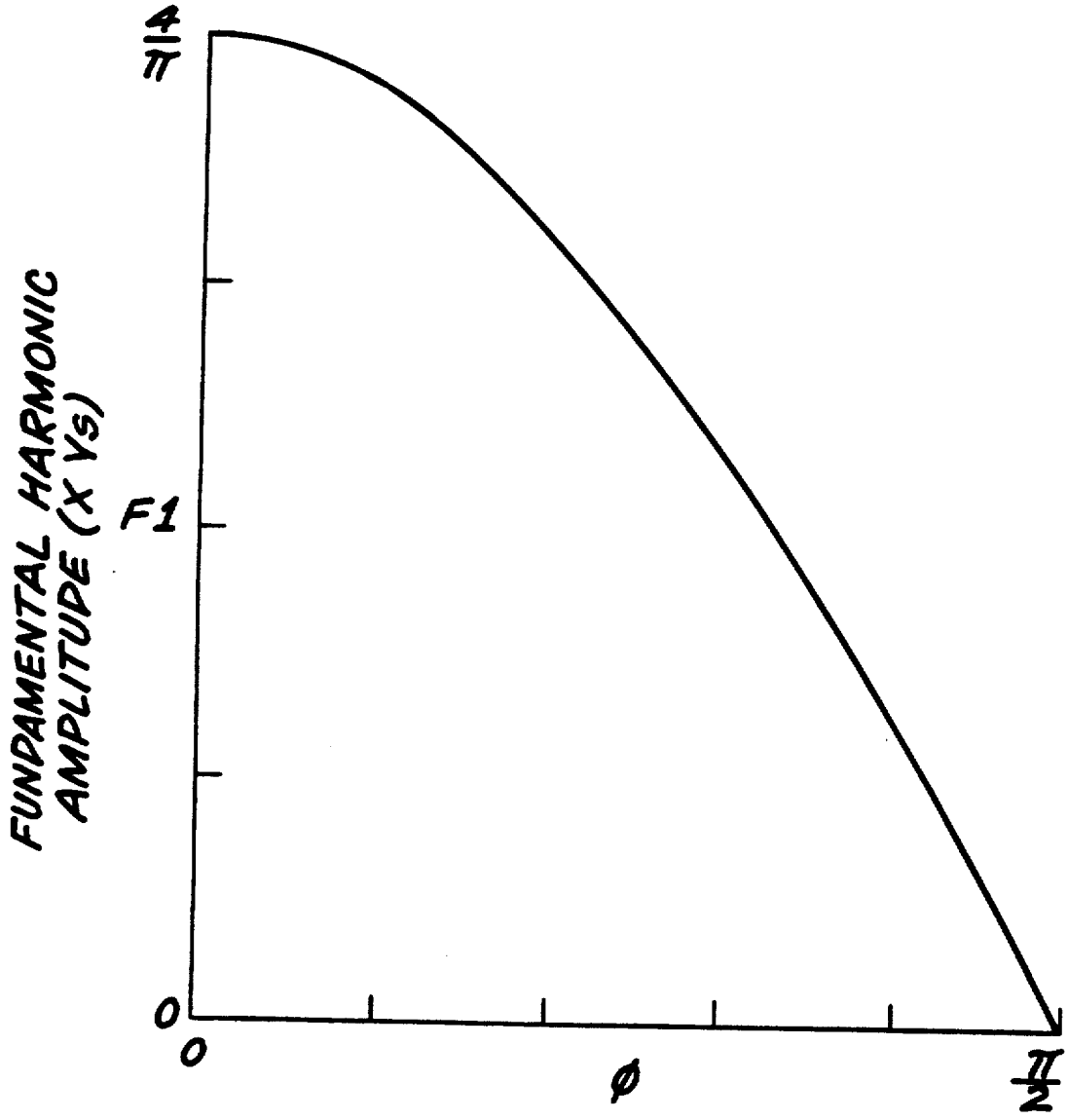
FIG. 5 is a graphical illustration showing the amplitude of the first harmonic of the signal of FIG. 5 plotted against the phase modulation angle.

FIG. 5 is a graph of the magnitude of fundamental harmonic F1 versus phase modulation angle $\phi$. As shown, for a 50% duty cycle (i.e., $\phi=0$), the fundamental harmonic F1 is at its maximum value $[4\pi V_s]$.

$$\frac{4}{\pi}V_s$$

As $\phi$ increases, the amplitude of the fundamental harmonic decreases. Therefore, phase modulation can be used according to the present invention to decrease the amplitude of the fundamental harmonic of the voltage applied to the series resonant inverter. As a result, and as is evident from FIG. 2, a broader range of controlled output load voltage may be obtained under all loading conditions by decreasing the effective voltage applied to the series resonant circuit.

Figure 6:
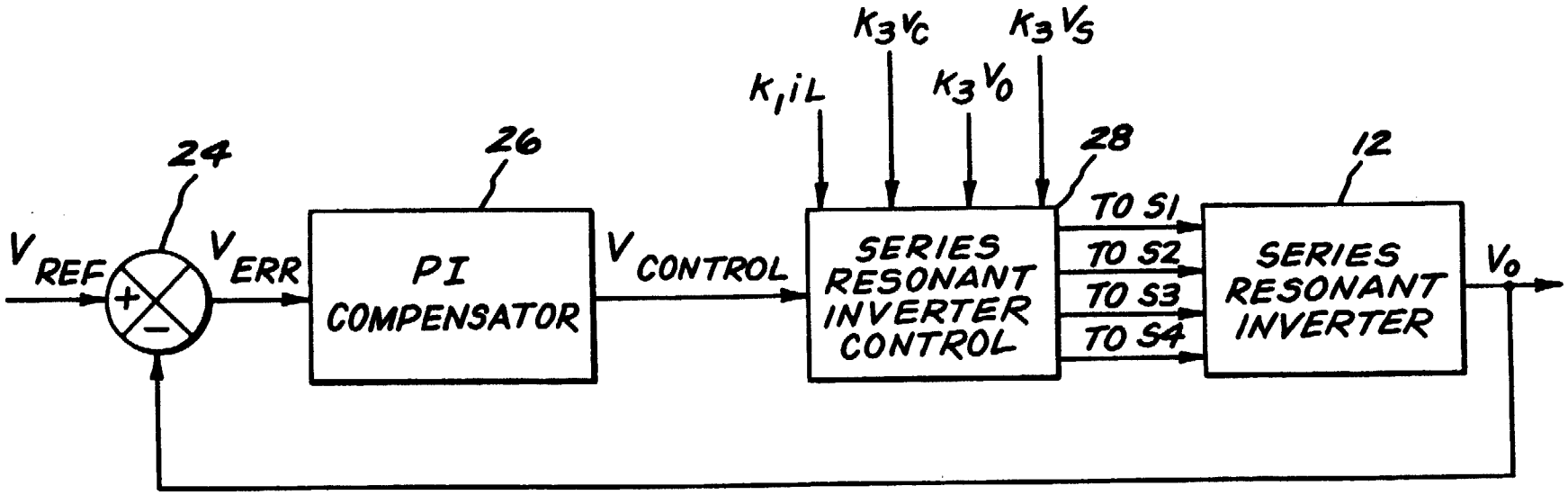
FIG. 6 is a functional block diagram of a resonant inverter control system employing the series resonant inverter control of the present invention.

FIG. 6 is a block diagram illustrating a resonant inverter control system employing the series resonant inverter control of the present invention. A commanded output voltage $V_{REF}$ is compared to output voltage $V_o$ by a summer 24. The resulting error signal $V_{ERR}$ is inputted to a proportional plus integral (PI) compensator 26 which generates control signal $V_{CONTROL}$. Control signal $V_{CONTROL}$ is provided to series resonant inverter control 28 which drives inverter 12. Control signals proportional to the aforementioned state determinants are also inputted to series resonant inverter control 28. These signals are represented as: $k_1 i_L$, $k_3 v_c$, $k_3 V_o$, and $k_3 V_5$, where $k_1$ and $k_3$ are constant scale factors to be described hereinafter.

Figure 7A:
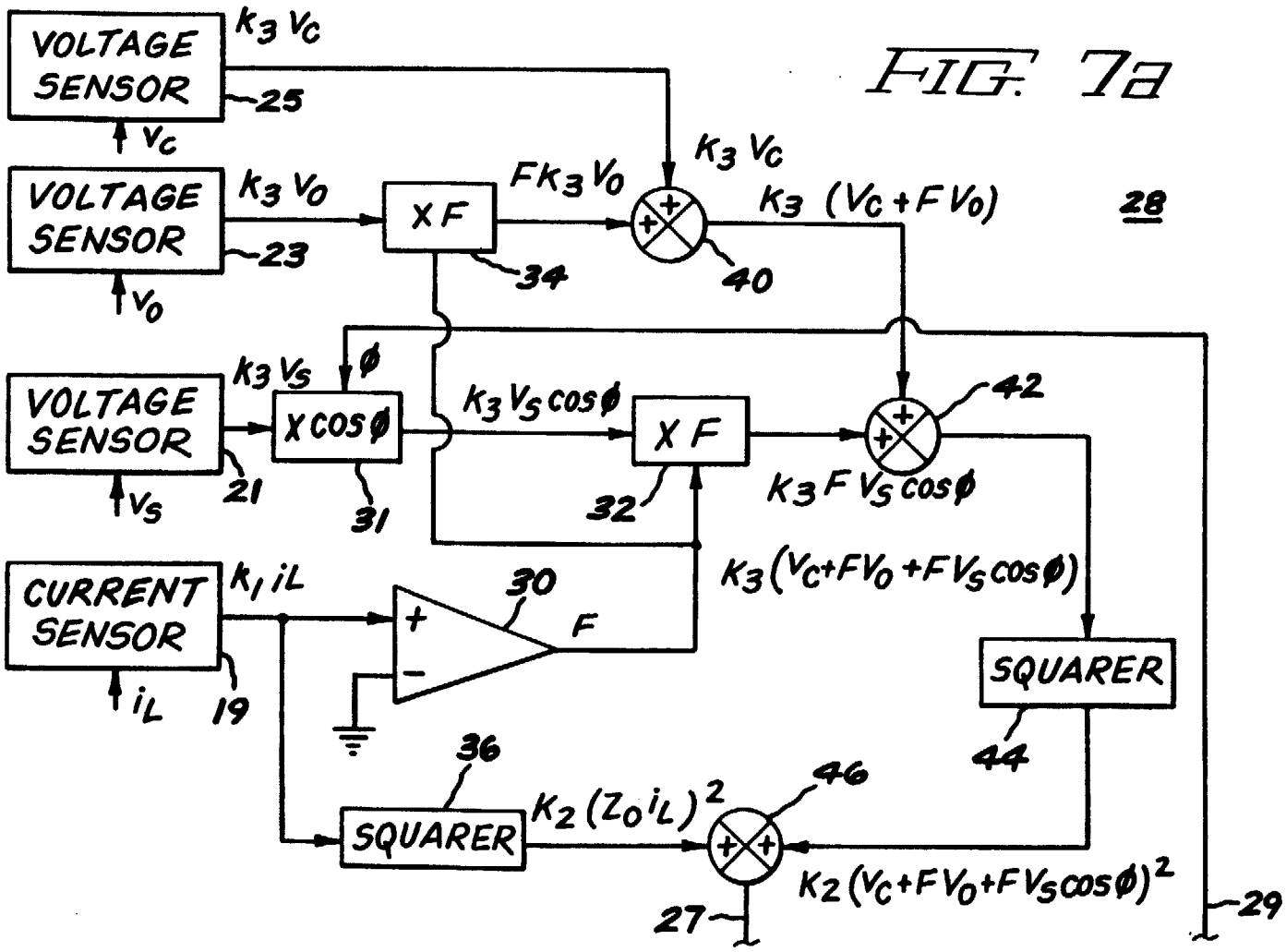
FIGS. 7a and 7b together comprise a functional block diagram of the preferred embodiment of the resonant inverter control according to the present invention.
Figure 7B:
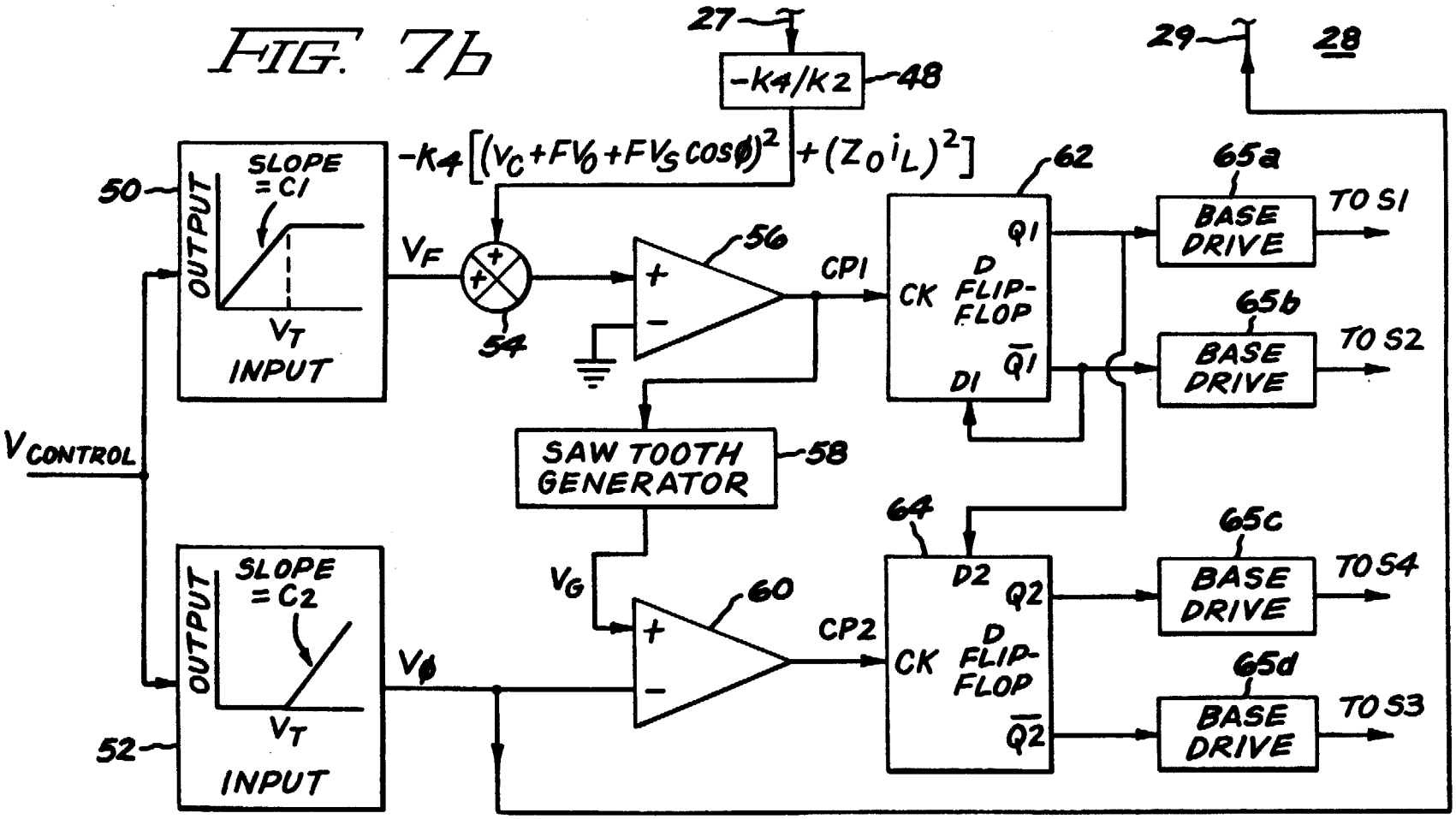

FIGS. 7a and 7b, connected at points 27 and 29, respectively, illustrate the preferred embodiment of the improved resonant inverter control 28 of the present invention. The control law of this improved system is a modification of the control law given by equation (2) to employ phase modulation and is represented as:

$$[(R_d V_s)^2 = (v_c - FV_o - FV_s \cos\phi)^2 + (i_L Z_o)^2.]$$

$$(R_d V_s)^2 = (v_c + FV_o + FV_s \cos\phi)^2 + (i_L Z_o)^2. \quad (4)$$

The state trajectory of the present invention (not shown), therefore, is a modification of that of FIG. 3 to account for the differences in a switching cycle interval resulting from the application of phase modulation to be described hereinafter.

Implementation of the control circuit according to the present invention involves the use of sensing devices to detect instantaneous values of state determinants $v_c$, $i_L$, $V_s$ and $V_o$. Since these sensing devices involve scaling to produce signals proportional to the respective state determinants, the following description, therefore, includes the aforementioned exemplary scale factors represented as constants $k_1$ and $k_3$. For example, control signal $k_1 i_L$, which is proportional to resonant inductor current, is derived from a suitable current sensor 19. Typical current sensors are well known in the art and many comprise, as examples: Hall effect current sensors, current sensing resistors, or current sensing transformers.

As shown in FIG. 7a, control signal $k_1 i_L$ is applied to a comparator 30. The output signal F of comparator 30 is either +1 or −1, depending upon the sign of inductor current $i_L$. The signal F is inputted to multipliers 32 and 34, the value of F being the multiplicative factor thereof. The control signal $k_1 i_L$ is also applied to a multiplier 36 which performs a squaring operation to produce the signal $k_2(Z_o i_L)^2$, where $Z_o = \sqrt{L/C}$, a constant, is the characteristic impedance of the series resonant circuit, and $k_2$ is also a constant.

Control signal $k_3 V_s$, which is proportional to the applied source voltage, is supplied by a source voltage sensor 21 to a multiplier 31 which multiplies control signal $k_3 V_s$ by $\cos\phi$, where $\phi$ is the aforementioned phase modulation angle value. Suitable voltage sensors are well known in the art and may comprise, for example, a voltage dividing network of resistors. Signal $k_3 V_s \cos\phi$ is applied to multiplier 32 and is thereby multiplied by signal F.

Control signal $k_3 V_o$, which is proportional to the output load voltage, is produced by a voltage sensor 23 and applied to multiplier 34 to yield a signal $Fk_3 V_o$. A summer 40 adds the signal $Fk_3 V_o$ to still another sensed control signal $k_3 v_c$, which is sensed by a voltage sensor 25 and is proportional to the voltage across the resonant capacitor. The resulting signal $[k_3(v_c - FV_o)]$ $k_3(v_c + FV_o)$ is added to the aforementioned signal $Fk_3 V_s \cos\phi$ by summer 42 to yield the signal $[k_3(v_c - FV_o - FV_s \cos\phi).]$ $k_3(v_c + FV_o + FV_s \cos\phi)$. The latter signal is inputted to a multiplier 44 which performs a squaring operation. The resulting squared signal $[k_2(v_c - FV_o - FV_s \cos\phi)^2]$ $k_2(v_c + FV_o + FV_s \cos\phi)^2$ is added to the hereinabove derived signal $k_2(Z_o i_L)^2$ by a summer 46 and, as shown in FIG. 7b, is then inputted to gain amplifier 48 having the transfer function $-k_4/k_2$ where $k_4$ is a constant. The output of amplifier 48 is a signal $[-k_4[(v_c - FV_o - FV_s \cos\phi)^2 + (Z_o i_L)^2]]$ $-k_4[(v_c + FV_o + FV_s \cos\phi)^2 + (Z_o i_L)^2]$, which is hereinafter referred to as the optimal control signal.

Control signal $V_{CONTROL}$ is provided to a frequency modulation controller 50 and a phase modulation controller 52. The transfer function of frequency modulation controller 50 is shown in FIG. 7b and may be represented mathematically as:

$$V_F = \begin{cases} C_1 \times V_{CONTROL}, \text{ for } V_{CONTROL} < V_T \\ C_1 \times V_T, \text{ for } V_{CONTROL} \geqq V_T \end{cases}$$

where $V_F$ is the output voltage of frequency modulation controller 50, $V_T$ is a threshold voltage representing operation at an extremity of the operable frequency range for the controllable switch means, and $C_1$ is a constant. Voltage $V_F$ is added in a summer 54 to the output signal of gain amplifier 48, and the result is inputted to the non-inverting input of a comparator 56. The output signal from comparator 56 is supplied to a sawtooth generator 58.

The transfer function of phase modulation controller 52 is also shown in FIG. 7b and may be represented mathematically as:

$$V_\phi = \begin{cases} 0, \text{ for } V_{CONTROL} < V_T \\ C_2(V_{CONTROL} - V_T), \text{ for } V_{CONTROL} \geqq V_T \end{cases}$$

where $V_\phi$ is the output voltage from phase modulation controller 52, $V_\phi$ being proportional to phase modulation angle $\phi$, and $C_2$ is a constant. Voltage $V_\phi$ is inputted to the inverting input of a comparator 60. The output signal $V_G$ of sawtooth generator 58 is supplied to the noninverting input of comparator 60. Voltage $V_\phi$ is also supplied to multiplier 31 for which $\cos\phi$ is the multiplicative factor.

The output signals CP1 and CP2 from comparators 56 and 60, respectively, provide the clock pulses for D-type (delay) flip-flops 62 and 64, respectively. As will be appreciated by those of skill in the art, since the signal at output D flip-flop 62 is supplied to the D1 input of D flip-flop 62, D flip-flop 62 is a divide-by-two flip-flop; that is, the output frequency is one-half that of the clock frequency. The output signals from the D flip-flops control the base drive circuitry 65a–65d for the respective switching devices S1-S4. Suitable base drive circuitry is well-known in the art.

In operation, since the output signal from comparator 56 which provides clock pulses to the divide-by-two D flip-flop 62 also drives sawtooth generator 58, the sawtooth generator produces a voltage ramp signal $V_G$ operating at twice the frequency of gate drive circuitry 65a–65d. In particular, the voltage ramp signal $V_G$ resets to zero each time the output signal at Q1 of D flip-flop 62 transitions from logic level 0 to 1 or 1 to 0. The output ramp voltage of sawtooth generator 58 is compared with voltage $V_\phi$ by comparator 60 which provides clock pulses for D flip-flop 64. For a positive edge triggered D flip-flop 64, for example, when the output signal of comparator 60 transitions from a low logic level to a high logic level, the signal at output Q2 of D-flip-flop 64 latches to the same value as the signal at output Q1 of D flip-flop 62.

For $V_{CONTROL}<V_T$, the output voltage $V_F$ of frequency modulation controller 50 is $C_1 V_{CONTROL}$, and the output voltage $V_\phi$ of phase modulation controller 52 is zero, thus indicating that phase modulation angle $\phi=0$. Therefore, since the value of phase modulation angle $\phi$ is provided to multiplier 31, and $\cos\phi=1$ for $\phi=0$, there is no phase modulation. On the other hand, there is frequency modulation. That is, the output voltage $C_1V_{CONTROL}$ of frequency modulation controller 50 is added to the output signal of summing amplifier 48 and applied to the non-inverting input of comparator 56. The output signal CP1 of comparator 56 provides clock pulses to D flip-flop 62 to toggle its state and, as stated above, also drives sawtooth generator 58. The output voltage [$V_c$] $V_G$ of the sawtooth generator is compared with voltage $V_\phi=0$ by comparator 60 which provides clock pulses CP2 to D flip-flop 64. As a result, D flip-flop 64 is toggled almost simultaneously with D flip-flop 62. In this way, for $V_{CONTROL}<V_T$, frequency modulation using optimal control is achieved when operating within the operable frequency range of the switching devices.

For $V_{CONTROL}\geqq V_T$, the output voltage $V_F$ of frequency modulation controller 50 is $C_1V_T$, a constant, so that the switching frequency of switching devices S1, S2, S3 and S4 is fixed at an extremity of the operable frequency range thereof. Under these conditions, the output voltage $V_\phi$ of phase modulation controller 52 is $C_2(V_{CONTROL}-V_T)$. This voltage $V_\phi$ is compared with the output signal $V_G$ of sawtooth generator 58 by comparator 60. As a result, the clock pulses CP2 from comparator 60 to D flip-flop 64 are delayed by an amount of time proportional to phase modulation angle $\phi$. Voltage $V_\phi$ also enables multiplier 31 to multiple source voltage $V_S$ by $\cos\phi$. In this way, phase modulation is employed to produce the tri-level voltage waveform shown in FIG. 4B for controlling the series resonant inverter. By thus combining a method of optimal trajectory control with phase modulation, a broader dynamic range of output load voltage can be achieved under all operating conditions.

Figures 8A, 8B, 8C, 8D, 8E, 8F, 8G, 8H, 8I:
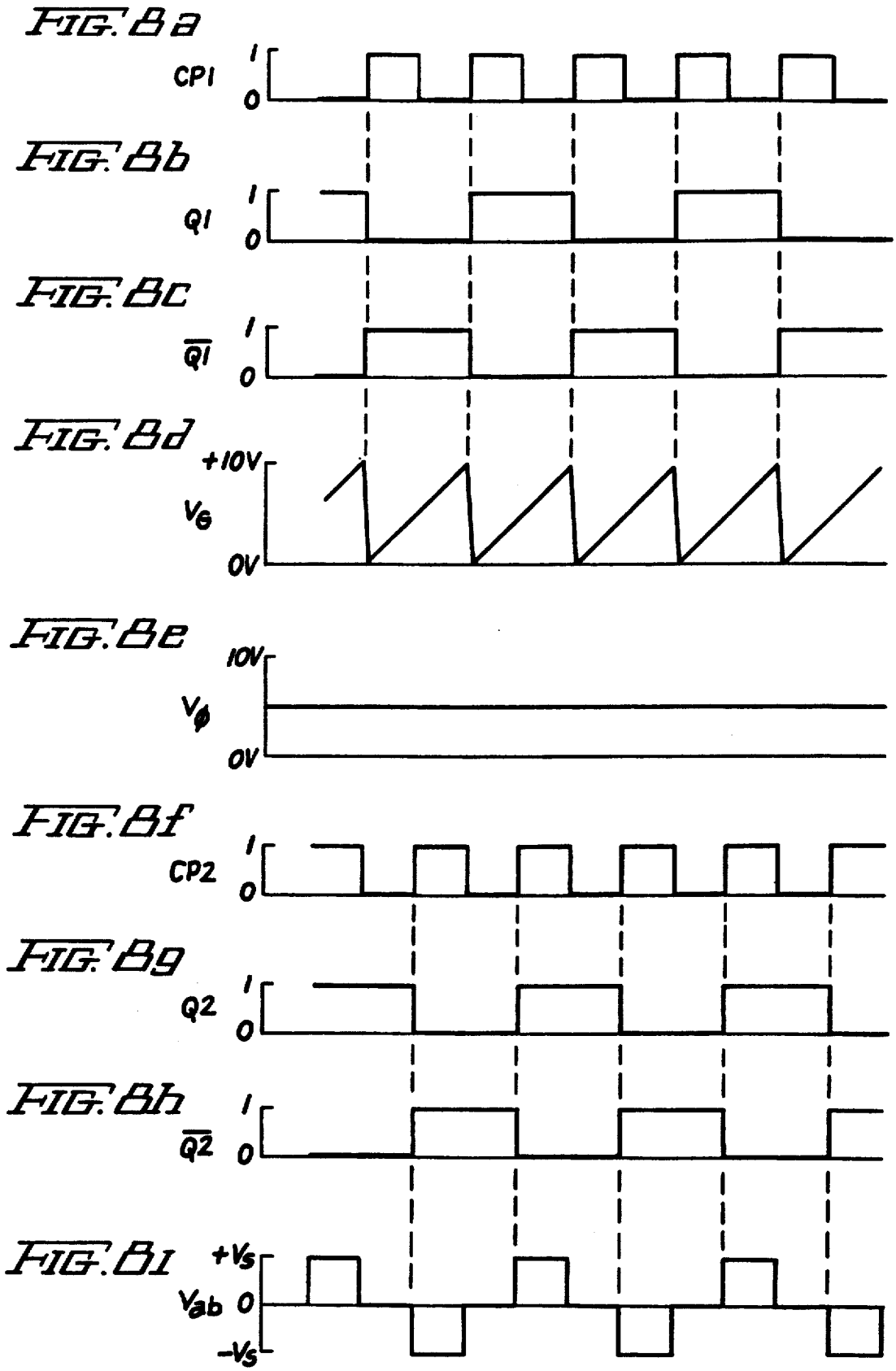
FIGS. 8a–8i are graphical representations of output signals from certain elements comprising the block diagram of FIGS. 7a–7b in order to illustrate operation of the resonant inverter control 12 of the present invention.

FIGS. 8a–8i are waveforms that illustrate in detail the operation of the new resonant inverter control for a specific case of $V_{CONTROL}>V_T$. For simplicity, assume the output signal CP1 of comparator 56 has a constant pulse width and is represented by the signal of FIG. 8a. For a positive edge-triggered D flip-flop 62, the output signals at Q1 and $\overline{Q1}$ respectively, are illustrated in FIGS. 8b and 8c, respectively. Voltage ramp signal $V_G$ from sawtooth generator 58, which is reset each time the output signals from D flip-flop 62 change state, is shown in FIG. 8d. Voltage $V_\phi$, which determines the phase modulation angle $\phi$, is illustrated as a voltage between 0 and 10 V in FIG. 8e. For this example, voltage $V_\phi=5$ V. The output signal CP2 of comparator 60, determined by comparing voltage $V_\phi$ with the output ramp voltage $V_G$ of sawtooth generator 58, is represented in FIG. 8f and constitutes clock pulses for D flip-flop 64. For a positive edge-triggered D flip-flop 64, the output signals at Q2 and [Q2] $\overline{Q2}$ respectively, are illustrated in FIGS. 8g and 8h, respectively. The flip-flop output signals at Q1, [Q1] $\overline{Q1}$, Q2 and [Q2] $\overline{Q2}$, respectively, control the base drive circuitry 65a–65 d, respectively, and produce as a result the tri-level phase modulated signal shown in FIG. 8i. From FIG. 8i and the equation for phase modulation angle $\phi$ given hereinabove, it can be seen that phase modulation angle $\phi=\pi/4$ radians for this example.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An improved dc-to-dc converter, comprising:

a resonant inverter having two pairs of controllable switch means, the switch means of each pair being connected in series and each pair of the series-connected switch means being adapted to be connected in parallel across an external dc supply;

a series resonant circuit connected between the junctions of said controllable switch means and comprising a capacitor and an inductor, said inverter being adapted to apply a rectangular wave voltage to said series resonant circuit;

a full wave rectifier inductively coupled to said series resonant circuit, the output of said rectifier being adapted to supply a substantially constant preselected output voltage to a load;

state determinant sensing means for continuously monitoring converter state determinants comprising voltage across said capacitor, current through said inductor, the [rectangular wave voltage applied to said series resonant circuit] *dc supply voltage*, and the output voltage;

optimal control means responsive to said state determinant sensing means for generating an optimal control signal corresponding to the instantaneous values of said state determinants;

first control means responsive to said optimal control signal for controlling the output voltage by frequency modulating the rectangular wave voltage applied to said series resonant circuit so as to maintain stable operation of said series resonant circuit when the operating frequency of said controllable switch means is within the operable frequency range thereof; and second control means responsive to said optimal control signal for controlling the output voltage by providing a phase modulation angle signal for phase modulating the rectangular wave voltage applied to said series resonant circuit and modifying said optimal control signal *in* accordance therewith so as to maintain stable operation *of* said series resonant circuit when the operating frequency of said controllable switch means is at an extremity of the operable frequency range thereof.

2. The improved converter of claim 1, further comprising:

frequency measuring means coupled to the output of said inverter for determining when the operating frequency of said controllable switch means is at an extremity of the operable range thereof.

3. The improved converter of claim 1 wherein said first control means comprises:

frequency modulation means for generating a frequency modulation signal;

comparison means for comparing said frequency modulation signal with said optimal control signal and for generating a difference signal resulting therefrom; and frequency control means responsive to said difference signal for generating a frequency control signal for varying the operating frequency of said controllable switch means.

4. The improved converter of claim 3, further comprising:

sawtooth generator means responsive to said frequency control signal for generating a ramp voltage;

second comparison means for comparing said ramp voltage with said phase modulation angle signal; and flip-flop means responsive to said frequency control signal and to the output signal of said second comparison means, said flip-flop means being coupled to said controllable switch means for providing control signals to vary the operating frequency of said controllable switch means when operating within the operable frequency range thereof and to phase modulate the rectangular wave voltage when operating at an extremity of the operable frequency range.

5. [At] *An* improved control for a resonant inverter, said inverter including a series resonant circuit which comprises a capacitor and an inductor, said inverter further including controllable switch means for producing a rectangular [are] *wave* voltage *when coupled to an external dc supply* and applying said voltage to said series resonant circuit, the output of said resonant inverter providing a substantially constant output voltage to a load, said improved control comprising:

state determinant sensing means for continuously monitoring converter state determinants comprising voltage across said capacitor, current through said inductor, the [rectangular wave voltage and applying said voltage applied to said series resonant circuit] *dc supply voltage*, and the output voltage;

optimal control means responsive to said state determinant sensing means for generating an optimal control signal corresponding to the instantaneous values of said state determinants;

first control means responsive to said optimal control signal for controlling the output voltage by frequency modulating the rectangular wave voltage applied to said series resonant circuit so as to maintain stable operation of said series resonant circuit when the operating frequency of said controllable switch means is within the operable frequency range thereof; and second [controls] *control* means responsive to said optimal control signal for controlling the output voltage by providing a phase modulation angle signal for phase modulating the rectangular wave voltage applied to said series resonant circuit and modifying said optimal control signal in accordance therewith so as to maintain stable operation of said series resonant circuit when the operating frequency of said controllable switch means is at an extremity of the operable frequency range thereof.

6. The improved control of claim 5, further comprising:

frequency measuring means coupled to the output of said inverter for determining when the operating frequency of said controllable switch means is at an extremity of the operable range thereof.

7. The improved control of claim 5 wherein said first control means comprises:

frequency modulation means for generating a frequency modulation signal;

comparison means for comparing said frequency modulation signal with said optimal control signal and for generating a difference signal resulting therefrom; and frequency control means responsive to said [differences] *difference* signal for generating a frequency control signal for varying the operating frequency of said controllable switch means.

8. The improved control of claim 7, further comprising:

sawtooth generator means responsive to said frequency control signal for generating a ramp voltage;

second comparison means for comparing said ramp voltage with said phase modulation angle signal; and flip-flop means responsive to said frequency control signal and to the output signal of said second comparison means, said flip-flop means being coupled to said controllable switch means for providing control signals to vary the operating frequency of said controllable switch means when operating within the operable frequency range thereof and to phase modulate the rectangular wave voltage when operating at an extremity of the operable frequency range.

9. A method for controlling a resonant inverter, said inverter having controllable switch means for producing a rectangular wave signal *when coupled to an external dc supply* and applying said signal to a series resonant circuit which comprises a capacitor and an inductor, the output of said resonant inverter providing a substantially constant output voltage to a load, said control method comprising the steps of:

continuously monitoring state determinants comprising voltage across said capacitor, current through said inductor, [said rectangular wave signal] *the dc supply voltage*, and said output voltage;

generating an optimal control signal corresponding to a predetermined combination of the instantaneous values of said state determinants;

frequency modulating said rectangular wave signal applied to said series resonant circuit so as to maintain stable operation of said series resonant circuit when the operating frequency of said controllable switch means is within the operable frequency range thereof; and generating a phase modulation angle signal for phase modulating said rectangular wave signal and modifying said optimal control signal in accordance therewith so as to maintain stable operation of said series resonant circuit when the operating frequency of said controllable switch means is at an extremity of the operable frequency range thereof.

* * * * *